(12) United States Patent
Balakrishnan et al.

(10) Patent No.: US 7,227,899 B2
(45) Date of Patent: Jun. 5, 2007

(54) METHOD AND SYSTEM FOR RE-MULTIPLEXING OF CONTENT-MODIFIED MPEG-2 TRANSPORT STREAMS USING INTERPOLATION OF PACKET ARRIVAL TIMES

(75) Inventors: Jeyendran Balakrishnan, Los Gatos, CA (US); Hemant Malhotra, Newark, CA (US); Thierry Foucu, San Jose, CA (US)

(73) Assignee: SkyStream Networks Inc., Sunnyvale, CA (US)

( * ) Notice: Subject to any disclaimer, the term of this patent is extended or adjusted under 35 U.S.C. 154(b) by 741 days.

(21) Appl. No.: 10/640,866

(22) Filed: Aug. 13, 2003

(65) Prior Publication Data

US 2005/0036519 A1   Feb. 17, 2005

(51) Int. Cl.
  *H04N 7/18*  (2006.01)
(52) U.S. Cl. .............................. 375/240.26; 375/240.28
(58) Field of Classification Search ................................ 375/240.25–240.09
  See application file for complete search history.

(56) References Cited

U.S. PATENT DOCUMENTS

| | | | |
|---|---|---|---|
| 5,537,408 A | 7/1996 | Branstad et al. | |
| 5,566,174 A | 10/1996 | Sato et al. | |
| 5,596,581 A | 1/1997 | Saeijs et al. | |
| 5,703,877 A | 12/1997 | Nuber et al. | |
| 5,790,543 A * | 8/1998 | Cloutier | 370/252 |
| 5,835,668 A | 11/1998 | Yanagihara | |
| 6,002,687 A | 12/1999 | Magee et al. | |
| 6,038,000 A * | 3/2000 | Hurst, Jr. | 375/240.26 |
| 6,252,873 B1 * | 6/2001 | Vines | 370/389 |
| 6,470,049 B1 * | 10/2002 | Nguyen | 375/240 |
| 6,819,865 B2 * | 11/2004 | Ando et al. | 386/95 |
| 2003/0002587 A1 | 1/2003 | Nguyen | |
| 2003/0043924 A1 | 3/2003 | Haddad et al. | |

* cited by examiner

*Primary Examiner*—Andy Rao
(74) *Attorney, Agent, or Firm*—Proskauer Rose LLP (57) ABSTRACT

A system and method is provided for revising the time stamp information in an MPEG-2 encoded data transport stream after content in the transport stream is modified. Incoming packets are stamped with arrival times and packet sequence counts. Synchronization points within the elementary stream are identified and arrival times for those synchronization points are calculated. After elementary streams are modified, commensurate arrival times are calculated based on arrival times and packet sequence counts of incoming packets, as well as the arrival times of the identified synchronization points within the elementary stream and the bit ratio between the incoming packets and the modified outgoing packets. Calculated arrival times are stamped on the outgoing packets and used to time the output of the outgoing stream.

13 Claims, 6 Drawing Sheets

METHOD AND SYSTEM FOR RE-MULTIPLEXING OF CONTENT-MODIFIED MPEG-2 TRANSPORT STREAMS USING INTERPOLATION OF PACKET ARRIVAL TIMES

RELATED APPLICATIONS

The subject matter of this application is related to the subject matter of the following U.S. patent applications, all of which are commonly assigned to the same assignee as is this application:

(1) U.S. patent application Ser. No. 10/640,872, filed concurrently herewith for Jeyendran Balakrishnan and Shu Xiao and entitled Method And System For Modeling The Relationship Of The Bit Rate Of A Transport Stream And The Bit Rate Of An Elementary Stream Carried Therein;

(2) U.S. patent application Ser. No. 10/641,322, filed concurrently herewith for Jeyendran Balakrishnan and Shu Xiao and entitled Model And Model Update Technique In A System For Modeling The Relationship Of The Bit Rate Of A Transport Stream And The Bit Rate Of An Elementary Stream Carried Therein;

(3) U.S. patent application Ser. No. 10/640,871, filed concurrently herewith for Jeyendran Balakrishnan and Hemant Malhotra and entitled Method And System For Re-Multiplexing Of Content-Modified MPEG-2 Transport Streams Using PCR Interpolation; and (4) U.S. patent application Ser. No. 10/641,323, filed concurrently herewith for Jeyendran Balakrishnan and Hemant Malhotra and entitled Method and System for Time-Synchronized Forwarding of Ancillary Information in Stream Processed MPEG-2 Systems Streams.

The contents of the above-listed patent applications are incorporated herein by reference.

FIELD OF THE INVENTION

The present invention pertains to signals that are hierarchically organized into a systems layer stream and a lower layered elementary stream, where an elementary stream is streamed information of a component of a program, such as an audio signal or a video signal. An example of a systems layer stream is a transport stream. In particular, the invention pertains to selectively modifying one or more portions of an elementary stream and inserting the modified portions of the elementary stream into a modified systems layer stream. The modified systems layer stream is configured so as to enable identification, extraction and real-time reproduction of its various portions.

BACKGROUND OF THE INVENTION

This invention is described in the context of audio-video programs, which include at least one audio signal or one video signal. However, those of ordinary skill in the art will appreciate the applicability of this invention to other types of program signals.

A program signal is composed of one or more component signals referred to herein as elementary streams. An example of an elementary stream can be one (natural or synthetic) audio signal, one (natural or synthetic) video signal, one closed captioning text signal, one private data signal, etc. Several techniques are known for compressing, formatting, storing and conveying such elementary streams. For example, the MPEG-1, MPEG-2, MPEG-4, H.263, H.263++, H.26L, and H.264/MPEG-4 AVC standards provide well-known techniques for encoding (compressing and formatting) video. Likewise, MPEG-1 (including the so-called "MP3"), MPEG-2, MPEG-4 and Dolby AC-3, provide techniques for encoding audio.

In addition, there are several known techniques for combining elementary streams for storage or transmission. MPEG-2 defines a technique for segmenting each elementary stream into packetized elementary stream ("PES") packets, where each PES packet includes a PES packet header and a segment of the elementary stream as the payload. PES packets, in turn, may be combined with "pack headers" and other pack specific information to form "packs". Alternatively, the PES packets may be segmented into transport packets of a transport stream, where each transport packet has a transport packet header and a portion of a PES packet as payload. These transport packets, as well as others (e.g., transport packets carrying program specific information or DVB systems information, entitlement management messages, entitlement control messages, other private data, null transport packets, etc.) are serially combined to form a transport stream.

In another known technique according to MPEG-4 systems, elementary streams may be divided into "sync-layer" (or "SL") packets, including SL packet headers. SL packets may be combined with PES packet headers, to form PES packets, and these PES packets may be segmented and combined with transport packet headers to form transport packets. According to another technique, transport packets are not used. Rather, elementary stream data is segmented and real-time protocol ("RTP") packet headers are appended to each segment to form RTP packets. In addition, or instead, user datagram protocol ("UDP") or transmission control protocol ("TCP") packet headers may be appended to segmented data to form UDP or TCP packets. Many combinations of the above are possible including formatting the elementary streams into SL packets first and then formatting the SL packets into RTP packets, encapsulating transport packets into TCP packets according to the so-called multiprotocol encapsulation("MPE"), etc.

The MPEG-2 PES and transport streams encapsulating MPEG-2 video will be used herein as a model for illustrating the invention. Also, this invention is illustrated using a hierarchical signal, wherein elementary streams are carried as segments in packets or cells of one or more higher layers. The term "systems layer" is herein used to refer to such higher layers. The MPEG-2 PES streams and transport streams will be used as a specific example of the systems layer. However, those skilled in the art will appreciate that other kinds of hierarchical layers may be used interchangeably as the systems layer for the elementary stream, such as the SL layer, the RTP layer, etc. Furthermore, "systems layer" need not be restricted to the "transport layer" according to the OSI seven layer model but can, if desired, include other layers such as the network layer (e.g., internet protocol or "IP"), the data link layer (e.g., ATM, etc.) and/or the physical layer. Also, other types of elementary streams, such as encoded audio, MPEG-4 video, etc. may be used. In addition, the term "transmission" is used herein but should be understood to mean the transfer of information under appropriate circumstances via a communications medium or storage medium to another device, such as an intermediate device or a receiver/decoder.

Audio-visual programs are obtained by using an appropriate combination of one or more elementary streams for storage or transmission of data. For example, one audio elementary stream and one video elementary stream may be combined, or one video elementary stream and multiple audio elementary streams may be combined. The transport stream format enables both single program transport streams (SPTS) in which the elementary streams of a single audio-visual program are multiplexed together into a serial stream, and multiple program transport streams (MPTS), in which the component elementary streams of multiple audio-visual programs are all multiplexed together into a single serial stream.

Figure 1:
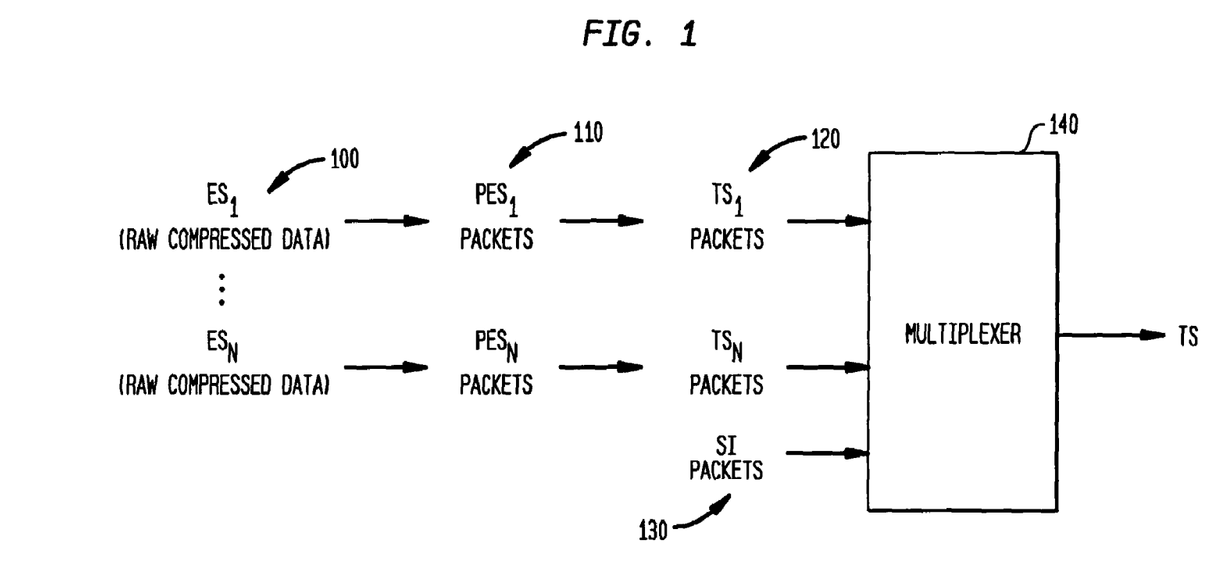
FIG. 1 is a schematic view of certain steps for processing raw compressed data into an MPEG-2 transport stream.

Referring to FIG. 1, to form a transport stream, each of N elementary streams 100 (including $ES_1$, $ES_2$, through $ES_N$) is first packetized into N packetized elementary streams of (PES) packets 110, independent of its underlying compression format. Each PES packet is comprised of a PES packet header and a segment of a single elementary stream as a payload, which contains data for only a single elementary stream. However, a PES packet may contain data for more than one decoding unit (e.g., data for more than one compressed picture or for more than one compressed audio frame). A variety of packetization strategies for forming PES packets from an elementary stream are permitted.

Figure 2:
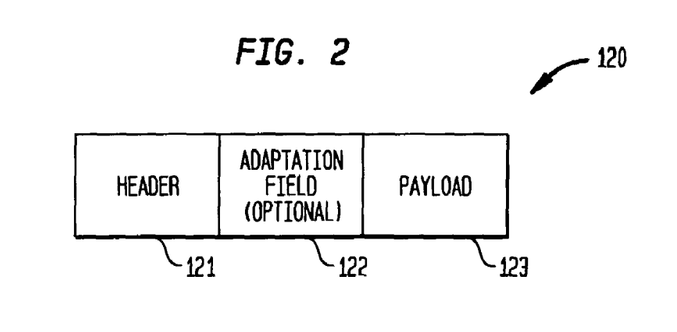
FIG. 2 is a representation of a TS packet in the transport stream of FIG. 1.

PES packets from each elementary stream are further packetized into fixed size (188 byte) Transport Stream (TS) packets 120. Each TS packet 120, as shown in FIG. 2, consists of a fixed 4-byte Packet Header 121, an optional Adaptation Field 122 of variable length, and the remaining bytes containing the PES packet data as Payload 123. The fixed Packet Header 121 contains a field called Packet IDentifier (PID), which is a unique numeric identifier or tag for each Elementary Stream 100 carried in a Transport Stream 120. For example, one PID is assigned to a video ES of a particular program, a second, different PID is assigned to the audio ES of a particular program, etc.

TS packets 120 from multiple underlying elementary streams 100 are then multiplexed together according to the rules for transport streams set forth in the MPEG-2 Systems specification. This includes insertion of special TS packets 130 containing System Information (SI), which include tables specifying the different programs within the transport stream as well the PIDs which belong to each program. Thus the transport stream format consists of a lower compression layer, comprising the component elementary streams, and a higher systems layer, comprising the PES and TS packets.

The systems layer contains important timing information which enables the receiver to play back the audio-visual information in a time-synchronized manner. The PES packet header contains a Presentation Time Stamp (PTS) in the PES packet header which indicates the time instants at which the associated audio or video presentation unit (an audio or video frame) of a given audio-visual program should be decoded and presented to the user. This PTS is relative to the System Time Clock used by the transmitting encoder. The TS packets also carry samples of this encoder clock called Program Clock References (PCR) in a quasi-periodic manner to enable the receiver to synchronize its clock to that of the encoder. This enables the receiver to decompress and present the audio and video data at the correct times, thereby recreating the original presentation.

A requirement for MPEG-2 transport streams is that the PCR for each program must be sent at least once every 100 ms. In the case of the DVB extension (*Specification of Service Information* (SI) *in DVB Systems*, ETSI Standard EN 300 468, May 2000) to MPEG-2, these PCR packets are to be sent at least once every 40 ms. PCR information, along with other optional information, is carried in the TS packet inside the Adaptation Field 122. The PCRs for a given program can be carried in the TS packets carrying any one of the component elementary streams 100 of that program (as identified by its PID), or they can be carried in separate TS packets with a unique PCR PID. Typically PCRs are carried in the video PID of a program.

In the MPEG-2 context, there are many applications that require one or more audio-visual programs carried inside a MPEG-2 transport stream to be modified at the elementary stream level, using stream processing devices. The prior art teaches a number of "stream processors" or devices, such as transcoders, editors and splicers, that process previously generated transport streams. A transcoder receives an already encoded elementary stream and re-encodes it, e.g., at a different bit rate, according to a different encoding standard, at a different resolution, using different encoding options, changing the audio sampling rate or video frame rate, etc. while maintaining the underlying content with as much fidelity as possible. A splicer is a device that appends one signal to another, inserts that signal in the middle of the first, or replaces part of the signal at a given instant. For example, a splicer may append one encoded elementary stream at the end of another elementary stream in a program so that they will be presented seamlessly and in sequence. Alternatively, the splicer could insert one program in the middle of another, e.g., in the case of inserting a commercial in the middle of a television show. An editor is a device that edits (modifies) an elementary stream and produces an edited encoded elementary stream. Examples of these devices are described in U.S. Pat. Nos. 6,141,447, 6,038,256, 6,094,457, 6,192,083, 6,005,621, 6,229,850, 6,310,915, and 5,859,660.

In such stream processing, the underlying bit positions of various parts of the elementary stream have been changed. For instance, video or audio transcoding tends to change the amount of information (number of bits) needed to represent each presentable portion of the video or audio. This is especially true for a transcoder that changes the bit rate of the output signal but is also true of a transcoder which, for example, re-encodes the elementary stream according to a different standard than it was originally prepared. Likewise, a splice or edit tends to change the relative location of two points (namely, the end point of the original encoded video signal portion that precedes the inserted elementary stream information and the beginning point of the original encoded video signal portion that follows the inserted elementary stream information) in the originally encoded video signal. Therefore, the modified elementary streams must be re-packetized and re-multiplexed into a syntax-compliant transport stream for serial transmission.

One of the critical requirements in transport stream output packetization and delivery is that the inherent information content in the outgoing elementary streams retain the same timing relationship as that of the input. This is required to enable the receiver to play back the underlying audio-visual presentation in a time-synchronized manner. Since the relationship between input and output elementary stream bits is invalidated by the process of stream processing, the output packetization process must somehow re-create the original timing relationship.

Existing approaches to this problem address this by using a full-fledged multiplexer at the output. This involves first recovering the original encoder clock for each modified program using clock recovery techniques like phase locked loops. Thereafter, the presentation times and decoding times of each outgoing audio or video frame are determined and re-stamped and inserted into the PES packets, and each outgoing TS packet is emitted in a manner that complies with the T-STD buffer model. Finally, PCR values are inserted into the emitted TS packets at the required frequency by looking up the recovered encoder clock at the instant of departure of the PCR-bearing TS packets. Since the timing information is completely regenerated and inserted, non-modified elementary streams in any processed program need to be de-packetized to their elementary stream levels, re-packetized, and re-transmitted. All these tasks, especially the need to obey T-STD buffer model requirements, impose a large implementation overhead, thereby increasing the complexity and cost of the stream processing system.

SUMMARY OF THE INVENTION

It is therefore an object of this invention to provide simplified methods for generating timing information to be included in a content-modified transport stream.

In accordance with a first embodiment of the invention, a system and method are described for re-multiplexing elementary streams that are modified by a stream processing device into a stream compliant with a particular standard, such as an MPEG-2 transport stream format. The system may be implemented, for example, within a device such as a transcoder, splicer or editor. Each incoming TS packet entering the system, whether or not it is to be modified, is stamped with its time of arrival (TOA) using a local real-time clock, as well as its packet number in order of arrival within the full transport stream. The local real-time clock that is used need not be at the same 27 MHz frequency as the encoder clock of the incoming programs to be processed. Transport stream packets containing data to be modified are input to a stream processor, the stream processing algorithm is performed at the elementary stream level, and another sequence of transport stream packets are output. The input arrival time stamps of incoming TS packets that are not modified are left unchanged.

Before outputting transport stream packets with modified data, a new set of TOA values are calculated for the output transport stream packets using TOA interpolation based on the TOA values in the transport stream packets in the input transport stream before the content modification. In particular, TOA values for pre-determined synchronization points are used to assign TOA values to content-modified transport stream packets through interpolation. These new TOA values can then be used to synchronize the output of data from the re-multiplexer. With TOA stamps now available for all outgoing TS packets, whether modified or unmodified, the output multiplexer implements a simple algorithm which emits each outgoing TS packet after a constant delay past its corresponding arrival time stamp. Thus, a compliant MPEG-2 transport stream is delivered.

The advantage of the new system and method for re-multiplexing is that it has a significantly lower computational requirement than implementing a full-fledged re-multiplexer. Further, re-multiplexers using the inventive method can operate with only TS packets as input, unlike conventional re-multiplexers that need to accept PES packets as input. This allows simple re-multiplexing implementations that can be used for both modified and unmodified transport streams, enabling the implementation of a single re-multiplexing device that can forward audio-visual programs with or without stream modification into a compliant single or multi program MPEG-2 transport stream. A system or apparatus to carry out stream processing and re-multiplexing using the inventive method is also described.

DETAILED DESCRIPTION OF THE PREFERRED EMBODIMENTS

FIG. 1 depicts, for purposes of illustration, the creation of a Single Program transport stream (SPTS) or a Multi-Program transport stream (MPTS). N number of Elementary Streams 100, comprising one or more programs, are first packetized into N streams of PES packets 110. Those PES packets are then placed into TS packets 120. SI packets 130 with system information, tables specifying the different programs within the transport stream as well as the PIDs which belong to each program, are also generated. The TS packets 120 and the SI packets 130 are then multiplexed by Multiplexer 140 to generate a transport stream, TS.

FIG. 2 illustrates the format of each 188-Byte TS packet 120. Header 121 is four bytes and contains the PID for the TS packet. Some TS packets 120 contain an adaptation field 122 of variable length with PCR and other optional information. The remaining bytes of TS packet 120 contain the Payload 123.

Figure 3:
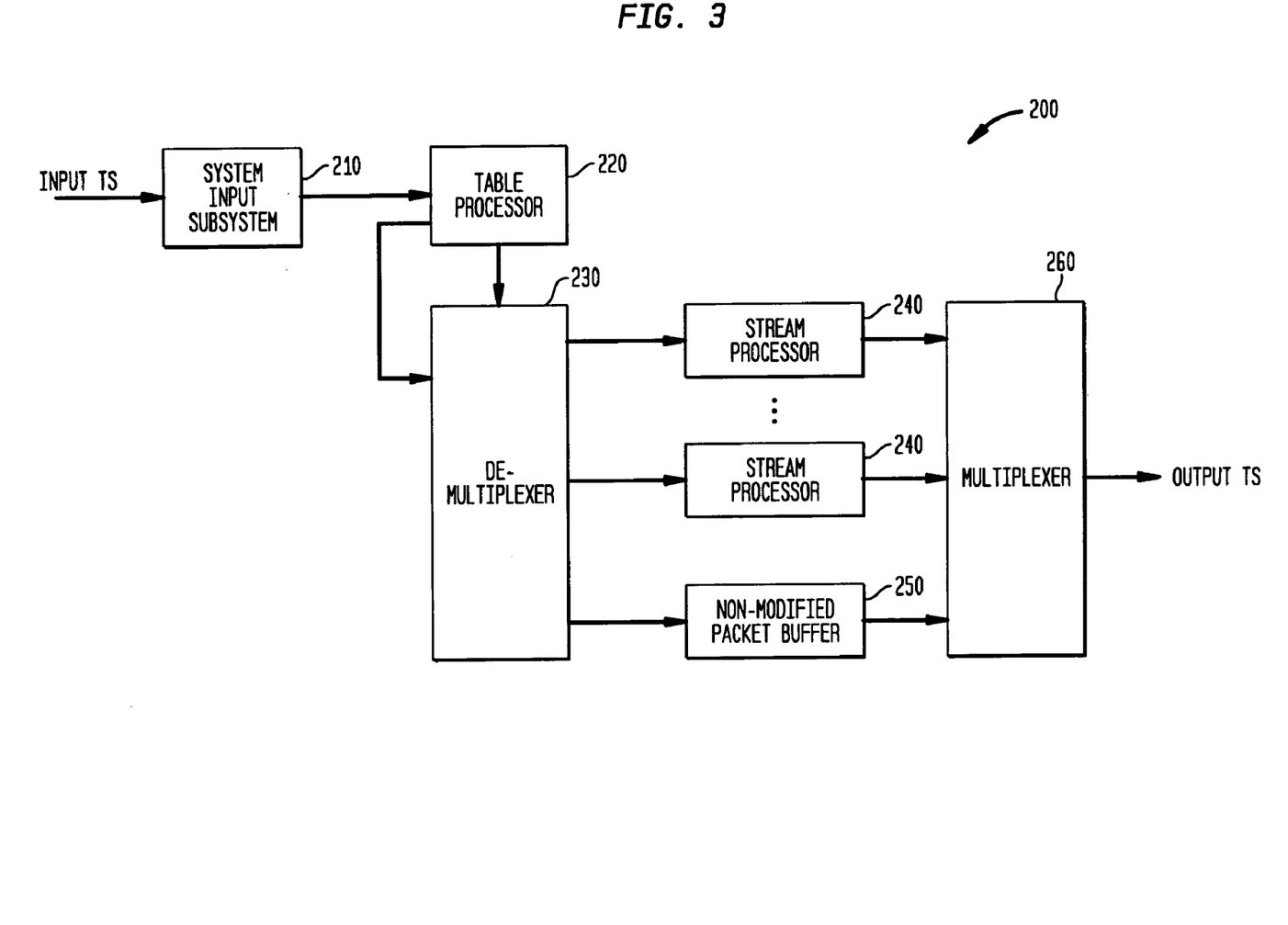
FIG. 3 is a block diagram of a system in accordance with an embodiment of the present invention for modifying the content of an incoming transport stream and remultiplexing the modified content into an outgoing transport stream.

FIG. 3 depicts an illustrative System 200 that, in accordance with the invention, accepts compliant MPEG-2 transport streams, processes one or more of the constituent elementary streams via corresponding stream processors, and multiplexes the results to deliver a compliant MPEG-2 transport stream as taught by the invention. Illustratively, such a system may be implemented using a suitably programmed network of one or more Mediaplex-20™ or Source Media Routers™ available from SkyStream Networks Inc., a company located in Sunnyvale Calif. The basic architectures of these devices are described in U.S. patent application Ser. No. 10/159,787 and U.S. Pat. No. 6,351,474, respectively The illustrated System 200 functionally includes a System Input Subsystem 210, a Table Processor Subsystem 220, a Demultiplexer Subsystem 230, one or more Stream Processor Subsystems 240, one or more Packet Buffers 250, and a Multiplexer Subsystem 260. Each stream processor 240 that modifies the content of a different elementary stream is equipped with a Timing Interpolation capability, which is explained below.

Figure 5:
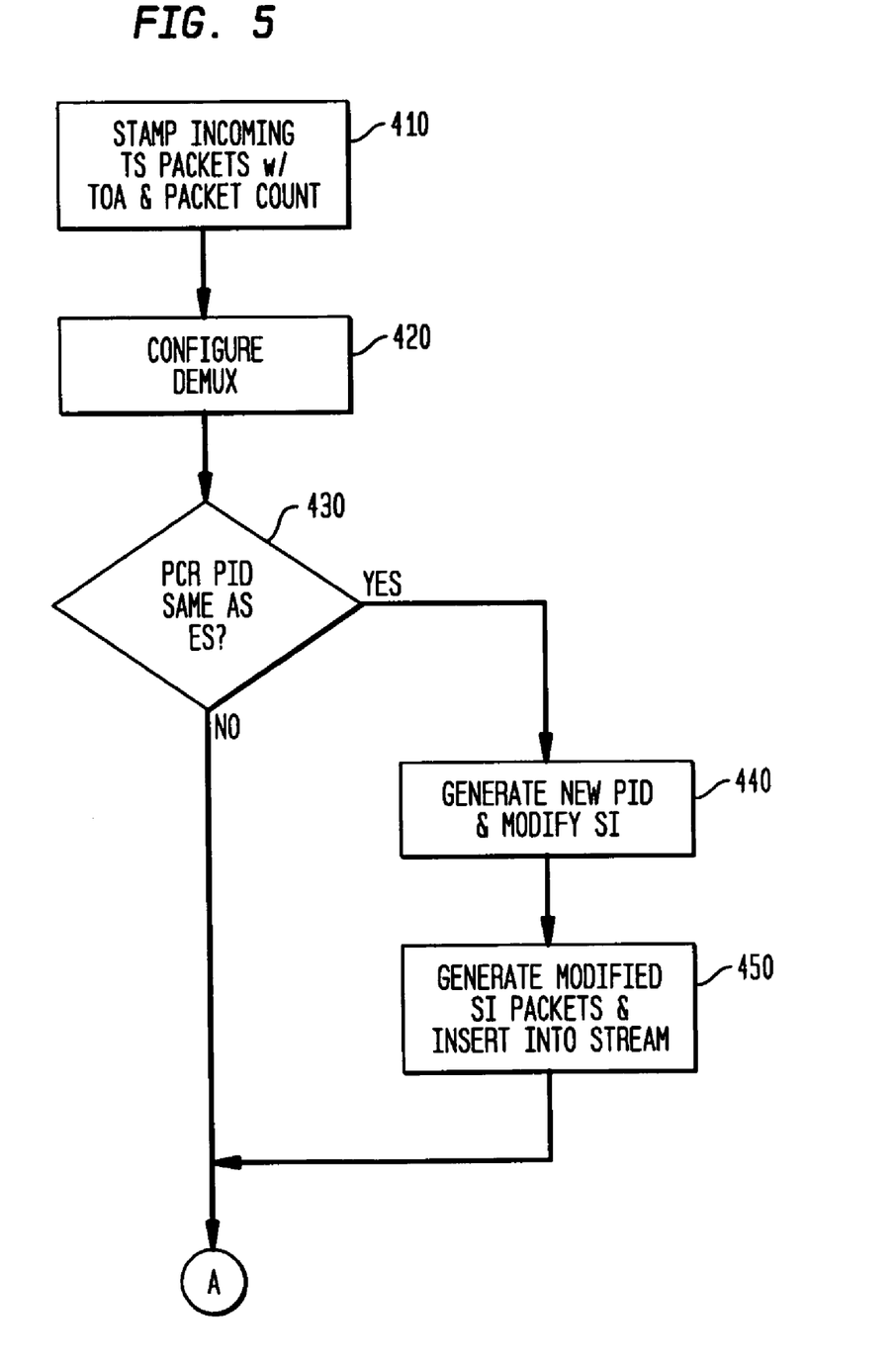
FIG. 5 is a flow chart of the initial steps undertaken for carrying out one embodiment of the inventive method with the system of FIG. 3.
Figure 6:
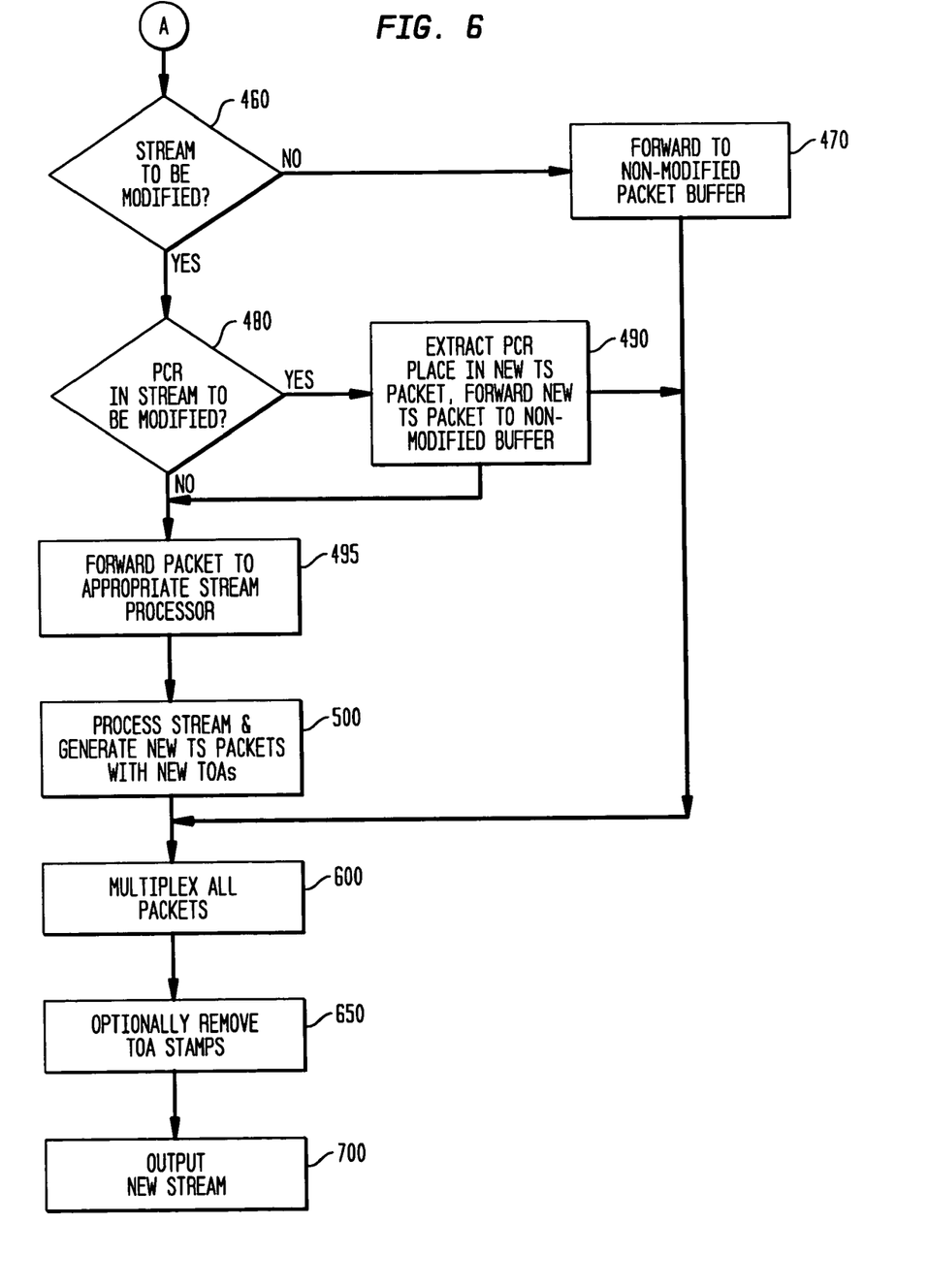
FIG. 6 is a flow chart of subsequent steps undertaken for carrying out one embodiment of the inventive method with the system of FIG. 3.

FIG. 5 and FIG. 6 are flowcharts for the first embodiment of the invention and illustrate the basic steps performed by the System 200 from the time that a transport stream is received through the time that a modified transport stream is output from System 200. At step 410 the System Input subsystem 210 receives each incoming TS packet, and stamps it with its packet sequence count and arrival time (TOA). The TOA is determined by looking up a local real-time clock (called RTC), which need not be synchronized to the system time clocks (STC) of any of the programs in the incoming transport stream (in fact the local clock need not even have the same nominal 27 MHz frequency). The packet count is determined in order of arrival, including any MPEG-2 null packets which may be present. The received packets, along with the additional information (TOA and packet count), are sent to the Table Processor Subsystem 220.

At step 420, the Table Processor 220 determines the different PIDs present in the transport stream, by parsing the tables present in the SI packets. Using this information, Table Processor 220 configures the Demultiplexer Subsystem 230 by informing it as to which PIDs are to be sent to which one or more Stream Processor 240, and which PIDs are not to be modified. In this embodiment, PCRs are never output in a packet with a PID corresponding to a modified elementary stream. If, at step 430, the Table Processor 220 determines that an incoming PCR PID is the same as that of an elementary stream to be modified, Table Processor 220 generates a new PCR PID that is different from all other PIDs present in the input transport stream, and modifes the SI tables as shown at step 440. At step 450 Table Processor 220 inserts these SI packets having modified SI tables into the transport stream accordingly.

At step 460, the Demultiplexer subsystem 230 extracts the PID of each TS packet and determines whether the TS packet is part of a stream that is to be modified. Any packet that is not part of a stream to be modified is sent to a Non-Modified Packet Buffer 250, as shown in step 470. The Non-Modified Packet Buffer 250 is used to hold input TS packets that are not to be modified until the modified TS packets output by Stream Processors 240 are ready for multiplexing with the unmodified packets.

If the Demultiplexer subsystem 230 in step 480 encounters a PCR in a packet with a PID that is the same as that of an elementary stream that is to be modified, it extracts and copies the PCR into a new TS packet identified with the new PCR PID generated by the Table Processor 220, fills up the rest of this new PCR-bearing packet with stuffing bytes, and passes this packet to the Non-Modified Packet Buffer 250 as shown in step 490. The PCR is removed from the original TS packet before the latter is forwarded in step 495 to the corresponding Stream Processor 240. All other TS packets that are to be modified and that do not contain PCRs bypass Step 490 and are forwarded directly to the corresponding Stream Processor 240.

At step 500, each Stream Processor 240 receives its corresponding TS packets, extracts the elementary stream, processes the stream according to its specific processing algorithm, and generates new TS packets containing the modified elementary stream payload. Further, according to this invention, it stamps each generated TS packet with a TOA that is as close as possible to the actual TOA which would have been stamped had the modified TS packets been actually received at the input, by interpolating the input TOA values using an interpolation algorithm. These new modified TS packets with the generated TOA values are passed along to the Multiplexer 260.

At step 600 the Multiplexer 260 receives TS packets from the Non-Modified TS Packet Buffer 250, as well as packets from Stream Processors 240. In all cases, TS packets received by the Multiplexer 260 contain corresponding TOA stamps. Using the TOA stamps, the Multiplexer 260 determines the time of departure for each outgoing TS packet using a suitable constant delay model, such as a constant delay model described for MPEG-2. According to this approach, the time of departure (TOD) for each outgoing TS packet is determined as:

$$TOD = TOA + d, \qquad (1)$$

where d is the constant delay through the system from the instant of arrival to the instant of departure. Multiplexer 260 might incorporate PCR correction in case actual TS packet departure times differ from the ideal value in equation (1). Since each outgoing packet thus effectively undergoes a constant delay through the system, the outgoing transport stream will be a compliant MPEG-2 transport stream.

At step 650 Multiplexer 260 may optionally remove TOA stamps after multiplexing. At step 700 the new transport stream is output.

Description of Output TOA Computation

A fundamental problem faced by the Stream Processor 240 in computing output TOAs is to determine how to associate TOA values for outgoing TS packets when the operation of stream processing destroys any connection between input and output bits.

Synchronization points in the TS packets, however, are present in both the transport stream input to a stream processor 240 and the bits output from the stream processor 240. Such synchronization points are described in detail in related application Ser. No. 10/641,323, referenced above and described in some detail below.

As taught therein, synchronization points are either physical bit patterns or logical points in the input elementary stream that do not vary under the operation of stream processing, irrespective of any transcoding or splicing. Additional attributes possessed by such synchronization points are that they regularly recur in both the input and output elementary streams, and each such point corresponds to a unique instant in the encoder system time clock (STC).

Synchronization points can be physical or virtual. Physical synchronization points consist of actual bit patterns (finite sequences of bits in the elementary stream) which are present in the input as well as the output, and which are a-priori associated with a certain presentation time. Examples of these are the well-known start codes or syncwords found in all the international video and audio coding standards such as MPEG-1, MPEG-2, MPEG-4, H.261, H.263 and H.26L. For example, in the case of MPEG-1 and MPEG-2 video, these include the sequence header code, GOP start code, picture start code, slice start code, sequence end code and other extension and user data start codes. MPEG-4 video has equivalents of all these start codes except for slice start code.

All MPEG (1, 2 or 4) based video processing devices that do not alter the frame rate must output one picture start code for each one that is received; hence picture start codes are synchronization points for this application. Further, in the case of MPEG-2 video, all such devices must forward the slice start codes received at the beginning of each row of macroblocks; these provide a denser sequence of synchronization points in addition to picture start codes. In the case of MPEG-1 audio Layers 1 and 2, the syncword at the start of each audio frame provides a dense sequence of synchronization points.

In order to carry out TOA interpolation, synchronization points must be selected beforehand during the design of the system. According to one method of selection, the synchronization points are selected such that there is at least one such point in every incoming TS packet carrying the elementary stream to be processed; this would ensure that there is a synchronization point for every incoming TOA stamp. A less demanding method taught by the invention is to select a less frequent sequence of synchronization points and use interpolation to calculate TOA values for outgoing TS packets.

Figure 4:
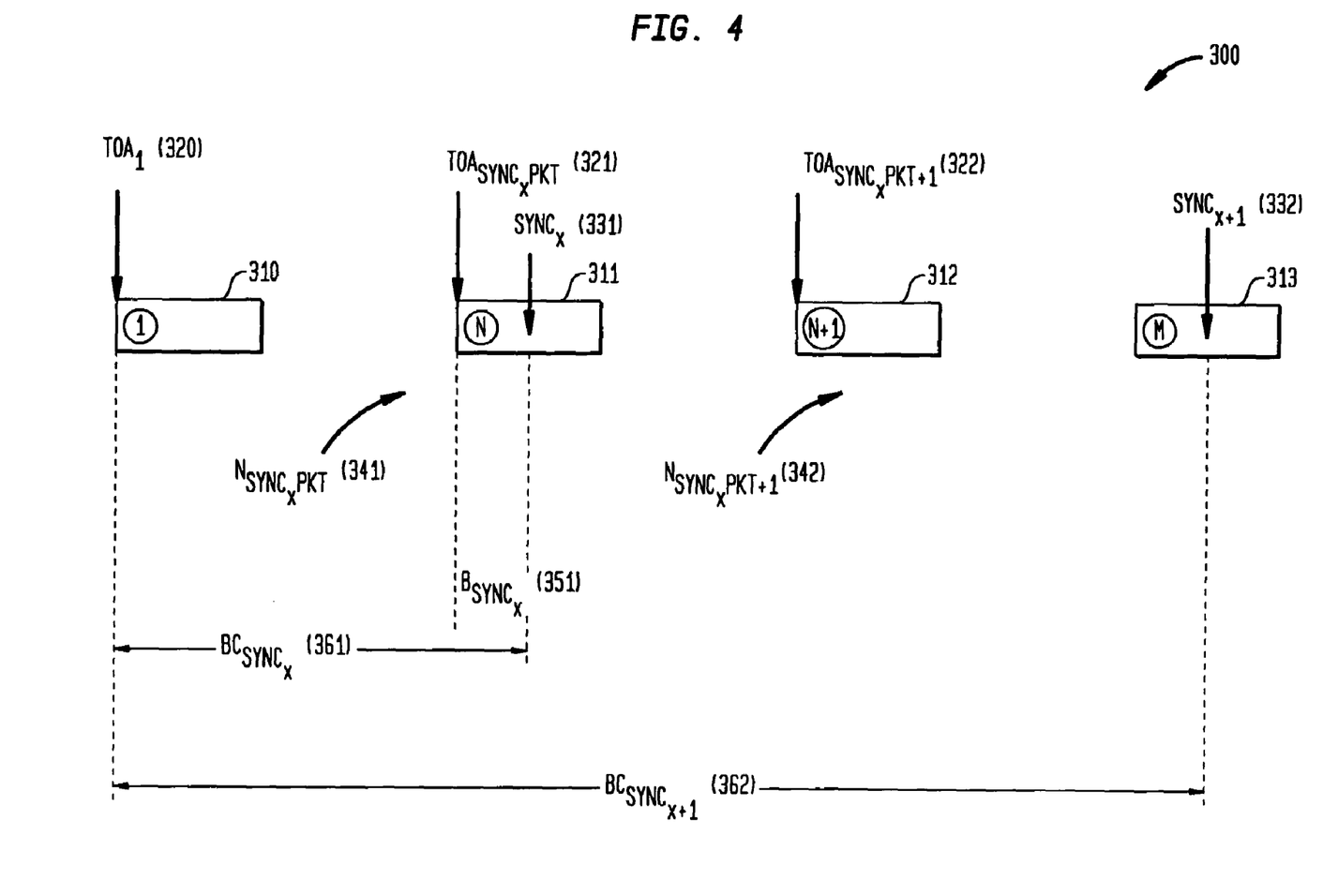
FIG. 4 shows a series of TS packets from the same elementary stream with their packet count and arrival time, in the incoming transport stream and the location of synchronization points in the packets in accordance with an embodiment of the present invention.
Figure 7:
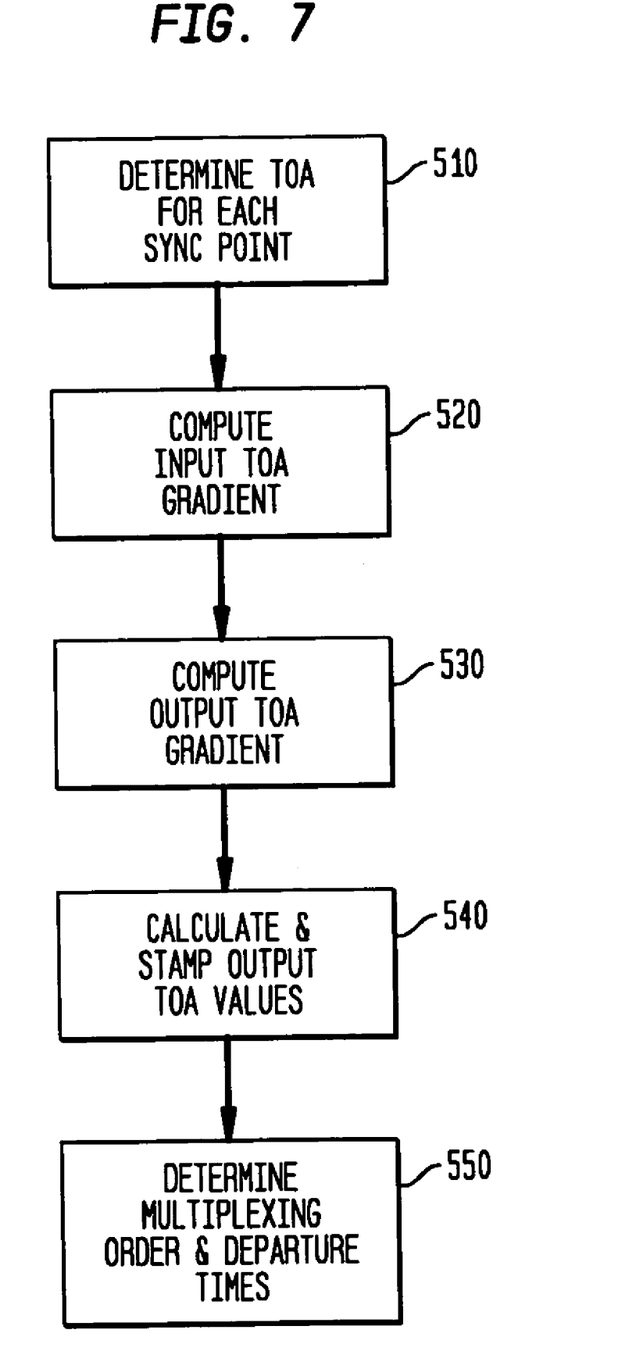
FIG. 7 is a flow chart describing the steps performed for calculating TOAs to be stamped onto modified packets in the outgoing transport stream in accordance with an embodiment of the present invention.

FIG. 4 and FIG. 7 illustrate how the inventive method uses the information System Input subsystem 210 stamps on each TS packet and synchronization points to calculate "arrival times" for modified packets. The first step 510 in the inventive method is to determine the TOA for the start of each synchronization point in the input. This is the instant at which the first byte of the synchronization point entered the system. This step is carried out at the input to the Stream Processor 240. The TOA ($TOA_{SYNCx}$) of a given synchronization point, $SYNC_x$ 331, is calculated as:

$$TOA_{SYNCx} = TOA_{SYNCxPKT} + (TOA_{SYNCxPKT+1} - TOA_{SYNCxPKT}) * B_{SYNCx} / (188 * (N_{SYNCxPKT+1} - N_{SYNCxPKT})) \quad (2)$$

where $TOA_{SYNCxPKT}$ 321 and $TOA_{SYNCxPKT+1}$ 322 are the input TOA stamps (as stamped by the System Input subsystem 210) of the incoming TS packet 311 containing Synchronization Point, SYNCx 331, and the TOA stamp of the next TS packet 312 with the same PID, $N_{SYNCxPKT}$ 341 and $N_{SYNCxPKT+1}$ 342 are the packet sequence counts (again as stamped by the System Input subsystem 210) of the above two TS packets with $TOA=TOA_{SYNCxPKT}$ 321 and $TOA=TOA_{SYNCxPKT+1}$ 322, respectively, and $B_{SYNCx}$ 351 is the distance in bytes between the first byte of the Synchronization Point, SYNCx 331 and the start of the TS packet containing it.

The effect of the above calculation is to translate the TOA from the start of the TS packet to the actual byte in the payload corresponding to the start of the synchronization point. This step 510 is carried out at the input to the Stream Processor 240, before the stream undergoes alteration.

The crucial advantage achieved in this step is that by definition each synchronization point also appears in the output and thus the TOA is available for these points in the output. The inventive method further teaches how to interpolate, from this sparse sequence of output TOA values, the appropriate TOA values for the start of each outgoing TS packet. This is achieved by first computing the gradient of the TOA (change in TOA per byte) between two successive synchronization points at the output, and using this gradient to stamp TOA values for each outgoing TS packet between these synchronization points.

The system next computes the output TOA gradient between every pair of successive synchronization points at the output. This is carried out at the time of output TS packet generation, and consists of two parts. In the first part, step 520, the input TOA gradients are calculated as follows:

$$\Delta IN_{SYNCx} = (TOA_{SYNCx+1} - TOA_{SYNCx}) / (BC_{SYNCx+1} - BC_{SYNCx}), \quad (3)$$

where $TOA_{SYNCx}$ and $TOA_{SYNCx+1}$ are the TOA values of two successive synchronization points, as computed using Equation (2), and $BC_{SYNCx}$ 361 and $BC_{SYNCx+1}$ 362 are their corresponding byte offsets in the input transport stream counting from the first byte in the input. The byte offset of any synchronization point in the input may be calculated as $$BC_{SYNC} = 188 * N_{SYNCPKT} + B_{SYNC}, \quad (4)$$

where $N_{SYNCPKT}$ is the packet sequence count of the input TS packet in which the synchronization point is contained, and $B_{SYNC}$ is its byte offset from the start of that packet, as described in the explanation for Equation (2).

The $\Delta IN_{SYNC}$ values correspond to the gradient of TOA at every output synchronization point, counted using input byte counts. But due to the modification of the underlying elementary stream by the stream processing algorithm, the number of input bytes between two synchronization points in the input may not match with the number of bytes between the same two synchronization points at the output. To account for this, the required output TOA gradient is computed in step 530 from the input gradient by multiplying the latter by the transmission ratio, which is the ratio of input bits to output bits resulting from the particular stream processing operation that is used. For example, in the case of transrating or reduction of bit rate, the transmission ratio would be equal to or greater than unity. However, in the case of splicing, where a portion of the input stream is replaced by a second stream, this ratio can be less than unity. Further, most stream processing operations modify the input bit counts in a variable manner, resulting in a variable transmission ratio; hence the latter must be recomputed for each synchronization point. The output TOA gradient, $\Delta OUT_{SYNCx}$, at a given synchronization point, $SYNC_x$ 331, is thus calculated as:

$$\Delta OUT_{SYNCx} = \eta_{SYNCx} * \Delta IN_{SYNCx}, \quad (5)$$

where $\eta_{SYNCx}$ is the transmission ratio of the synchronization point $SNYC_x$, and refers to the ratio of bytes between the synchronization point, $SNYC_x$, and the subsequent synchronization point in the input, and the corresponding byte count between the same two points in the output. The invention teaches that ideally, the value of $\eta_{SYNC}$ should be recomputed for every synchronization point. However, the invention also teaches a less restrictive approach in which it is recomputed only once for every suitably defined group of synchronization points. For example, in case of video transcoding, all the synchronization points in a picture can have the same value of $\eta_{SYNC}$, calculated using the input and output byte counts of a picture.

The final step, step 540, is to determine and stamp the output TOA values for each outgoing TS packet. This is achieved as follows. For each outgoing TS packet containing a synchronization point, the TOA ($TOA_{SYNCPKT}$) is calculated using the TOA of the synchronization point, the output byte offset and output TOA gradient:

$$TOA_{SYNCPKT} = TOA_{SYNC} - BOUT_{SYNC} * \Delta OUT_{SYNC}, \quad (6)$$

where $BOUT_{SYNC}$ is the output byte offset of the synchronization point from the start of the packet. For all other packets, the TOA ($TOA_{PKT}$) is extrapolated from the TOA of the preceding TS packet containing a synchronization point ($TOA_{SYNCPKT}$), using the output TOA gradient:

$$TOA_{PKT} = TOA_{SYNCPKT} + 188 * N_{PKT} * \Delta OUT_{SYNC}, \quad (7)$$

where $N_{PKT}$ is the distance (in output packet counts) of this TS packet from the last output TS packet containing a synchronization point.

As described earlier, the output Multiplexer 260, in step 550, uses the TOA of outgoing TS packets to determine their multiplexing order and departure times using a constant delay approach, thus delivering a compliant MPEG-2 transport stream.

Selecting Synchronization Points

As explained above, the input transport stream is parsed to identify "synchronization points" in the elementary stream it carries. Synchronization points are points or locations within a stream that can be used as a basis for identifying locations near which incoming ancillary data, such as PCR and TOA stamps, should be located in a new transport stream carrying a processed version of the incoming elementary stream. In principle, synchronization points are locations in the elementary stream which are known to bear a clear and fixed timing relationship with the system time clock of the program comprising the elementary stream and therefore can serve as a basis for retiming or re-synchronizing ancillary data to the system time clock in a sufficiently accurate fashion.

The types of synchronization points used according to the invention illustratively meet all of the following criteria:

(a) System Time Clock Correspondence: An important underpinning of the invention is that ancillary data can be re-timed or re-synchronized in the new systems layer stream produced after stream processing by locating the ancillary data in a certain vicinity of a synchronization point of the elementary stream after stream processing ("processed elementary stream"). That is, in lieu of determining the location by direct reference to the system time clock (which would require recovery of the system time clock), the ancillary data is located in a vicinity of a synchronization point of the elementary stream (which in turn, is in synchronism with the system time clock of the program comprising the elementary stream). Therefore, the type of point chosen for use as a synchronization point must correspond with a particular determinable time of the system time clock of the program comprising the elementary stream, even though this particular time need not be explicitly determined.

(b) Invariance to Stream Processing: According to the invention, ancillary data is initially located within the original systems layer stream, which in the embodiments discussed above is the transport stream, in a certain vicinity of a specific identifiable synchronization point in the elementary stream, prior to stream processing. Likewise, after stream processing, this ancillary data should be located within the new transport stream (more generally, the new systems layer stream) in a similar vicinity to the same synchronization point of the stream-processed elementary stream. In order to enable re-locating the ancillary data in the new elementary stream, the same synchronization point must be present in the elementary stream both before stream processing and after stream processing.

(c) Continual Recurrence In The Elementary Stream: Generally, ancillary data is expected to recur continually throughout the systems layer stream, or at least the sequence carrying the processed elementary stream. Likewise, the type of synchronization point chosen for use in the invention should also continually recur within the processed elementary stream. In other words, over the course of time, so long as information is being carried in the systems layer stream for the elementary stream to be stream processed, and so long as there is ancillary data to be retimed or re-synchronized, one should also expect to find synchronization points in the elementary stream. Otherwise, such candidate synchronizations point cannot provide a suitable reference by which to relate the ancillary data.

In addition to the above criteria, it is preferable to choose a type of synchronization point that occurs frequently within the elementary stream. As will be appreciated from the description below, the higher the frequency of occurrence of the synchronization point, the more accurate will be the retiming or re-synchronizing of the ancillary data in the new transport stream carrying the processed elementary stream. More specifically, two successive synchronization points define a temporal locale, which is a portion of an elementary stream corresponding to an elapsed duration in time of the system time clock of the program of which the elementary stream is a component. According to the invention, ancillary data occurring in a given temporal locale (between two synchronization points) of an input systems layer stream is gathered prior to processing the systems layer stream, and the specific temporal locale in which the ancillary data was gathered, is noted. After stream processing, the corresponding temporal locale in the processed elementary stream is located, and the ancillary data is inserted into the new systems layer stream, containing the processed elementary stream, at that identified temporal locale. However, the amount of elementary stream data in a given temporal locale may change as a result of the stream processing. As such, the precise corresponding time of the systems time clock at which ancillary data may be inserted into the new systems layer stream will be different than the original time of the systems time clock of the location within the original systems layer stream from which the ancillary data was extracted. This difference introduces an error or drift in the synchronism of the ancillary data relative to the original timing of such ancillary data in the systems layer stream before processing. It is desired to maintain such a synchronism error or drift within a tolerable range. In a worst case scenario, ancillary data located in the original systems layer stream at one end of a temporal locale (e.g., at the latest time or end of the temporal locale) is inserted into the new processed systems layer stream at the opposite end of the temporal locale (e.g., the earliest time, or beginning of the temporal locale). As can be appreciated, the maximum error or drift in synchronism is approximately equal to the duration of the temporal locale. Therefore, by increasing the frequency of synchronization points, the duration of temporal locales is shortened and the maximum possible error or drift in synchronism of ancillary data is reduced. In any event, it is generally preferred for the frequency of occurrence of the type of synchronization point to be at least equal to the frequency of occurrence of the ancillary data to be retimed or re-synchronized.

Considering these criteria, there are two classes of synchronization points that can be used, as discussed above. One is a physical synchronization point, which corresponds to a predefined, unvarying sequence of bits or code which can be identified in the bitstream. For example, in the case of an MPEG-1, MPEG-2 or MPEG-4 elementary stream, any start code can serve as a synchronization point. In the MPEG-1, MPEG-2 and MPEG-4 standards, each start code is a 32 bit code comprising a 23 bit start code prefix 0000 0000 0000 0000 0000 0001 followed by one byte that distinguishes the type of start code from each other type. The following are examples of MPEG-2 video start codes, and the distinguishing byte that identifies them:

TABLE 1

| Name | Start code identifier |
|---|---|
| Picture_start_code | 00 |
| slice_start_code | 01 - AF |
| user_data_start_code | B2 |
| sequence_header_code | B3 |
| extension_start_code | B5 |
| sequence_end_code | B7 |
| group_start_code | B8 |

Of these, the group_start_code, the picture_start_code and the slice_start_code are typically good candidates for use as synchronization points. The group_start_code immediately precedes a group of pictures (GOP) within the video elementary stream. GOP's are "entry points" i.e., random access points, at which a decoder can arbitrarily start decoding, e.g., in a trick mode operation (jump, fast forward, rewind, etc.). Such an entry point may also be used by a decoder when it is powered on, or otherwise caused to tune to, a systems layer stream which is already in the middle of transfer. The picture_start_code is required by MPEG-1, MPEG-2 and MPEG-4 (and optional in MPEG-4 part 10) to be present at the start of each encoded video picture. Depending on the type of stream processing, this start code will also be present in the video elementary stream after stream processing. Also, this start code is synchronized to the start of a video picture and therefore coincides with the true decoding time and presentation time of the picture (whether or not DTSs or PTSs representing the decoding time and/or presentation time are present in the systems layer stream). Generally speaking, picture_start_codes will occur at a higher frequency than group_start_codes. The slice_start_code is also a good candidate. The slice_start_code is provided at the beginning of a slice, which (according to MPEG-1 and MPEG-2) includes all or part of the macroblocks of a given macroblock row of a video picture. (According to H.264, a slice can span more than one macroblock row.) The particular macroblock row to which the slice_start_code pertains can be easily determined using a well-defined formula. Therefore, the slice_start_code coincides with the time of presentation of a decoded version of the corresponding slice location in the video picture. Generally speaking, slice_start_codes will occur at a much higher frequency that picture_start_codes. Typically, there will be at least one slice per macroblock row, and a device that parses the elementary stream can determine the particular horizontal offset within the macroblock row at which the slice occurs. Therefore, the correspondence of the slice to the display time of information represented by the slice can be determined.

In some circumstances, it is difficult to choose an actual physical synchronization point that meets all of the above criteria. For example, in transcoding an MPEG-2 video signal to an MPEG-4 video signal, slices may appear in the MPEG-2 video signal but not the MPEG-4 video signal. In the alternative, the physical synchronization points that do appear might not recur at a sufficiently high enough frequency to provide a good reference for retiming or re-synchronizing the ancillary data. For example, picture start codes might not occur frequently enough to provide a sufficiently accurate reference by which ancillary data, such as PCRs, can be resynchronized. In such a case, it may be desirable to choose a virtual synchronization point. Unlike a physical synchronization point, a virtual synchronization point might not correspond to a very explicitly predetermined code or sequence of bits. Rather, a virtual synchronization point might correspond to a bit, or sequence of bits, representing a well-defined, deterministically identifiable layer of the elementary stream, which may start with an arbitrary bit pattern not known ahead of time. For example, MPEG-2 video slices contain individual macroblocks, and each macroblock starts with a variable length code indicating the macroblock address increment. The variable length code representing the macroblock address increment is chosen from a table of multiple macroblock address increment codes. Such a variable length code can be easily identified, but it is not known ahead of time which specific one will be encountered; the specific code encountered will depend on the number of skipped macroblocks between the last encoded macroblock and the current encoded macroblock. Nevertheless, the location of the macroblock in a video picture can be determined with absolute accuracy and therefore so can the corresponding display time of the macroblock. Therefore, the start of a macroblock can provide a very effective virtual synchronization point because, generally, they occur at an even higher frequency than slices.

As stream processing can include any combination of transcoding, editing or splicing, the amount of information in an elementary stream between two successive synchronization points may be changed. For example, in transcoding, the amount of information: (a) in a video picture, between video picture start codes; (b) in a slice, between slice start codes; or (c) in a sequence of one or more macroblocks, between successive macroblock address increment codes, can be changed. Likewise, consider the case of a splice where several video pictures are inserted between two video pictures of an original elementary stream. By definition, the amount of elementary stream information between the picture start code of the original video picture preceding the insert, and the picture start code of the original video picture following the insert, will increase. Nevertheless, the synchronization points will survive the stream processing operation. Moreover, systems layer stream information that was temporally located at a particular vicinity of one synchronization point in the original elementary stream should be temporally located as close as possible to that same synchronization point in the new systems layer stream containing the processed elementary stream.

As can be appreciated from the discussion above, many factors influence the choice of types of synchronization point to be used to retime or re-synchronize the ancillary data. According to one embodiment, the choice of synchronization point type(s) to be used is predetermined and remains fixed during operation. However, it is preferable to adapt the choice of synchronization point type, either once for each elementary stream, or dynamically in real-time, to suit the particular stream processing, types of elementary stream(s) to be processed and types of ancillary data to be retimed or re-synchronized. Illustratively, the choice of synchronization type may be chosen by an operator or automatically selected by the system according to the invention. Generally, automatic adaptation is not only attractive (to minimize operator training and dependence) but also feasible. The reason is that the stream processor, and other devices that work with it, must be able to parse the incoming systems layer and elementary streams as well as to format them. It is not too much effort to also provide circuitry or software instructions which can determine the relative frequencies of occurrence of different types of ancillary data, synchronization points, etc. to facilitate automatic selection of synchronization point type(s). Note also that more than one type of synchronization point type may be used simultaneously; the synchronization point types need only occur serially in the elementary stream. In addition, it is sometimes desirable to use both physical synchronization points, such as start codes, and virtual synchronization points, such as the points in the bit stream corresponding to macroblocks, simultaneously. This would ensure that synchronization points occur in the bit stream with a sufficiently high frequency of occurrence and regularity.

The above discussion is intended to be merely illustrative of the invention. Those having ordinary skill in the art may devise numerous alternative embodiments of the methods and systems described above without departing from the spirit and scope of the following claims.

The claimed invention is:

1. A method of processing a series of original elementary stream segments within an original systems stream, the original systems stream comprising a series of systems stream segments, each stream segment comprising a systems layer specific segment of information and one elementary stream segment, the series of systems stream segments comprising the series of original elementary stream segments to be processed, the method comprising:
    (a) recording the time of arrival and the segment count of each systems stream segment of the original systems stream;
    (b) identifying a first and subsequent synchronization points within the series of original elementary stream segments to be processed, wherein the synchronization points are a type of sequential location of the elementary stream (1) which recurs continually throughout the elementary stream, (2) is synchronized to a systems time clock of the elementary stream, and (3) is always present in the elementary stream both prior to and after the processing;
    (c) calculating an arrival time for the first and the subsequent synchronization points;
    (d) processing elementary stream information within the series of original elementary stream segments to produce a modified sequence of elementary stream information to be carried between the first and the subsequent synchronization points;
    (e) inserting the modified sequence of elementary stream information into a series of new elementary new stream segments;
    (f) calculating a new arrival time for each elementary stream segment within the series of new elementary stream segments based on the arrival times and segment counts of segments within the series of original elementary stream segments, and arrival times of the first and the subsequent synchronization points; and
    (g) inserting the series of new elementary stream segments into a new systems stream.

2. The method of claim 1 wherein the series of original elementary stream segments contains an intervening segment with no synchronization point between the first and the subsequent synchronization points.

3. The method of claim 1 wherein the new series of elementary stream segments comprises an elementary stream segment containing the first synchronization point, an intervening elementary stream segment with no synchronization point, and an elementary stream segment containing the subsequent synchronization point, wherein interpolation is used to calculate an arrival time for the intervening elementary stream segment with no synchronization point.

4. The method of claim 1 wherein the time of arrival for the first synchronization point is calculated based on the arrival time of the segment containing the first synchronization point and the position of the synchronization point within the segment containing the synchronization point relative to the start of the segment.

5. The method of claim 1 wherein the calculation of a new arrival time for each elementary stream segment within the series of new elementary stream segments is further based on the ratio of the number of bits in a plurality of original elementary stream segments to the number of bits in a plurality of new elementary stream segments.

6. The method of claim 1, wherein each of said systems stream segments in the original systems stream has an identifier, wherein said systems stream segments comprising said elementary system segments belonging to a particular elementary stream are identified by the same identifier, and wherein a first series of program clock references are included in systems stream segments identified by the same identifier used to identify a particular elementary stream, said method further comprising:
    assigning a new identifier for said first series of program clock references; and
    inserting said first series of program clock references into systems stream segments identified by said new identifier.

7. The method of claim 6 wherein said newly-identified system stream segments comprising said series of program clock references are forwarded for insertion into said new systems stream.

8. A method of processing one elementary stream in an original transport stream of multiple elementary streams, the one elementary stream to be consumed according to a predefined and deterministic schedule relative to a particular system clock of a program that comprises the elementary stream, the original transport stream comprising a series of transport packets, each transport packet comprising a systems layer specific segment of information and one elementary stream segment, the series of transport stream packets comprising an original series of transport stream packets containing the one elementary stream, the method comprising:
    (a) recording the time of arrival and the packet count of each transport packet in the original transport stream;
    (b) identifying a first and subsequent synchronization points within the original series of transport packets containing the one elementary stream, wherein the synchronization points are a type of sequential location of the one elementary stream (1) which recurs continually throughout the elementary stream, (2) is synchronized to a systems time clock of the elementary stream, and (3) is always present in the elementary stream both prior to and after the processing;
    (c) calculating an arrival time for the first and the subsequent synchronization points;
    (d) processing elementary stream information within the original series of transport packets containing the one elementary stream to produce a modified sequence of elementary stream information to be carried between the first and the subsequent synchronization points;
    (e) inserting the modified sequence of elementary stream information into a series of new transport packets;
    (f) calculating a new arrival time for each packet within the series of new transport packets based on the arrival times and packet counts of transport packets within the original series of transport packets containing the one elementary stream, and arrival times of the first and the subsequent synchronization points; and
    (g) inserting the series of new transport packets into a new systems stream.

9. The method of claim 8 wherein the series of original transport packets containing the one elementary stream contains an intervening packet with no synchronization point between the first and the subsequent synchronization point.

10. The method of claim 8 wherein the series of new transport packets comprises a transport packet containing the first synchronization point, an intervening transport packet with no synchronization point, and a transport packet containing the subsequent synchronization point, wherein interpolation is used to calculate an arrival time for the intervening transport packet with no synchronization point.

11. The method of claim 8 wherein the time of arrival for the first synchronization point is calculated based on the arrival time of the transport packet containing the first synchronization point and the position of the synchronization point within the transport packet containing the synchronization point relative to the start of the transport packet.

12. The method of claim 8, wherein each of said transport packets in the original systems stream has an identifier, wherein said transport packets comprising said elementary system segments belonging to a particular elementary stream are identified by the same identifier, and wherein a first series of program clock references are included in transport packets identified by the same identifier used to identify a particular elementary stream, said method further comprising:

assigning a new identifier for said first series of program clock references; and inserting said first series of program clock references into transport packets identified by said new identifier.

13. The method of claim 12 wherein said newly-identified transport packets comprising said series of program clock references are forwarded for insertion into said new systems stream.

* * * * *